Dec. 16, 1941.   F. B. BRATEK ET AL   2,266,487
METHOD OF CHILLING BEEF
Filed May 26, 1939
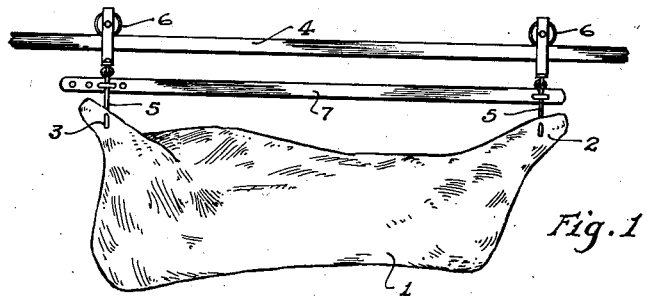
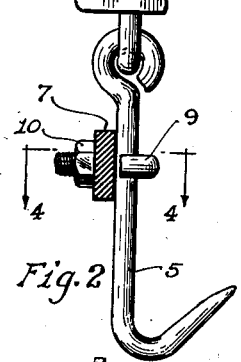
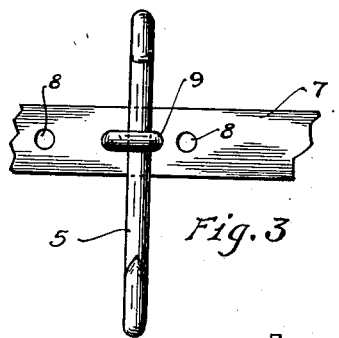
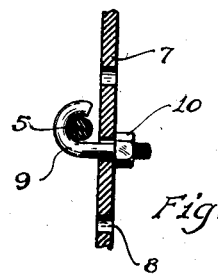
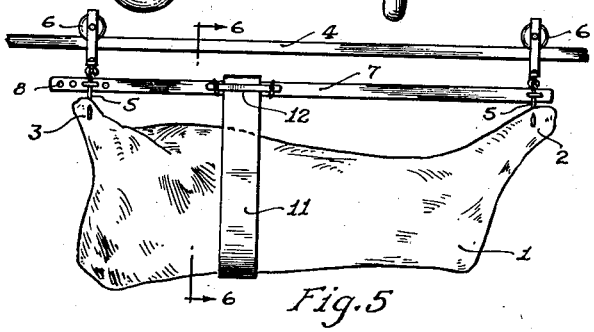
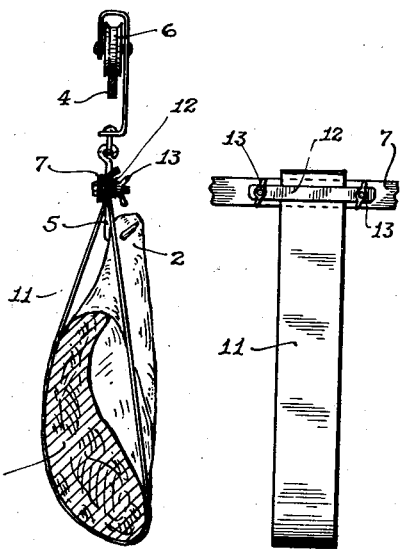
Frank B. Bratek and
Andrew S. Hartanov
INVENTOR
BY
ATTORNEY Patented Dec. 16, 1941

2,266,487

UNITED STATES PATENT OFFICE 2,266,487

METHOD OF CHILLING BEEF

Frank B. Bratek and Andrew S. Hartanov, Chicago, Ill., assignors to Industrial Patents Corporation, Chicago, Ill., a corporation of Delaware Application May 26, 1939, Serial No. 275,862

8 Claims. (Cl. 62—173).

This invention relates to a method of preparing for market edible animal carcasses.

In the conventional practice of preparing animal carcasses for market, for example, a beef carcass, the carcass is dressed and split and the halves or sides hung by one end, generally, the hind legs at the heel cords. The suspended sides are then transferred to a refrigerating chamber wherein they are chilled and become set. This practice results in setting of the bone structure and flesh portions of the carcass or side in a strained or tensioned condition because the entire weight of the carcass or side is supported solely from one point, the heel cord. This practice also results in a tendency of certain portions of the flesh to become toughened because various muscle portions set while in the strained or stretched condition.

In Patents No. 1,719,030 and No. 1,724,006, it has been proposed to place the carcass or portions of the carcass on rigid racks or supports and adjust the position of the shanks so that the various portions of the carcass assume a position on the rack which corresponds closely to the relaxed or natural position. After the carcass is placed upon such rack, it is transferred to a refrigerating chamber, and the carcass becomes set in a relaxed or natural position. The use of the chilling racks involves additional handling of the carcass and presents serious sanitation problems.

One of the objects of our invention is to provide a method and means for supporting edible animal carcasses or portions of the carcass in a relaxed or substantially natural position during the chilling and setting period.

A further object of our invention is to provide means for supporting animal carcasses or portions of the carcass in a substantially natural position during the chilling and setting period which is simple in construction and which reduces the sanitation problem to a minimum.

Further objects and advantages of this invention will be apparent from the description and claims which follow.

Figure 1 is a side view illustrating a portion of a carcass supported in accordance with our invention.

Figure 2 is an enlarged fragmentary detail view illustrating a portion of the apparatus.

Figure 3 is a side view of the apparatus of Figure 2.

Figure 4 is a sectional view taken on line 4—4 of Figure 2.

Figure 5 is a side view illustrating a portion of a carcass supported in accordance with a further embodiment of our invention.

Figure 6 is a sectional view taken on line 6—6 of Figure 5.

Figure 7 is an enlarged fragmentary detail view of a portion of the apparatus of Figure 5.

Figure 8 is a side view of a portion of a carcass chilled and set in accordance with our invention.

Figure 9 is a similar view of a portion of a carcass chilled and set by suspending the side from the heel cord in accordance with standard practice.

The present invention contemplates suspending the carcass or a side of the carcass by the heel cord at both the front shank and hind shank in such a manner that the various portions of the carcass assume a more or less natural and relaxed position. For a better understanding of our invention, it will be illustrated by describing its practice with a side of beef, but it is to be understood that the invention is not limited to supporting only beef carcasses during chilling and setting.

In practicing our invention, a side of beef 1 is suspended by the heel cords of the hind shank 2 and the fore shank 3 from rail 4 by means of supporting members consisting of hooks 5 and trolleys 6. A spacing bar 7 is secured to the hooks 5 to maintain the supporting members in a desired predetermined spaced relation. The spacing bar 7 is preferably provided with a series of spaced apertures 8 adjacent one or both ends. Hooks 5 are secured to the spacing bar 7 by means of screw hooks 9, which are adapted to pass through apertures 8. The hook 5 and screw hook 9 are drawn tightly against bar 7 by means of a cooperating nut 10. The spacing bar is provided with a series of apertures 8 to permit adjustment of the distance between the supporting members to accommodate carcasses or sides of different size.

Before the side of beef is hung from the hooks, the distance between the supporting members is adjusted by securing the hooks at the proper apertures 8 to provide the desired spacing. The hooks are spaced apart a sufficient distance to permit the carcass to assume a more or less natural and relaxed position while it is suspended on the hooks. The carcass is suspended from the supporting members while the carcass is warm and before the body heat has left the carcass. After the carcass is suspended on the hooks, the trolleys are moved along the rail 4 into a refrigerating chamber where the carcass is chilled and the muscle and bone structure becomes set.

The apparatus disclosed in Figure 5 is similar to that described above and includes a pair of supporting members consisting of trolleys 6 carrying hooks 5 and a spacing bar 7 secured to the hooks. The side of beef 1, for example, is hung on hooks 5 in the same manner as described in connection with Figure 1. A band 11 is secured to one side of bar 7 and is adapted to support the side of beef at a point intermediate to the hooks 5. Bar 7 is provided with means for securing the free end of band 11 to the bar, such as a clamping plate 12 and thumb screws 13.

The supporting members are spaced the desired distance by adjusting the screw hooks to the required position. After the carcass is hung on the hooks 5, band 11, which forms a sling, is adjusted by drawing the band up to support the side at a desired position. In the case of sides of beef, a satisfactory supporting position is at about the eleventh rib.

After the carcass is hung and the sling adjusted, the carcass is transferred to a refrigerating chamber wherein the carcass is chilled and the muscle and bone structure becomes set.

In accordance with our invention we provide a positive spacing means for the supporting members which prevents the carcass or side of beef from collapsing by preventing the trolleys from being moved closer to each other. Since the flesh of the carcass has not yet set when the carcass is first hung on the hooks, it is essential that means be provided to prevent the hooks from approaching each other since such movement would cause the center portion of the carcass to fall downwardly and form an arched bow. In some cases it may be desirable to raise a certain portion of the carcass, and in that event a sling such as that disclosed in Figure 5 may be employed.

The apparatus which is employed in practicing our invention is exceedingly simple and presents no sanitation problem not encountered in conventional practice since the only elements which come in contact with the carcass are the hooks, and, in some instances, the sling. Chilling and setting of a carcass by our method eliminates the usual arching or curvature of the back, as shown by a comparison of Figure 8 with Figure 9, which illustrates the curvature of the back secured in conventional practice. The set carcass chilled in accordance with our invention has a very slight curvature of the back side and a plumper and a well filled out backbone section, as shown in Figure 8.

We claim:

1. The method of treating edible animal carcasses which comprises suspending a carcass side from the hind shank and the fore shank with its back side down while the carcass side is warm and before the body heat has left the carcass side, securing the hind shank and fore shank in fixed spread relationship to cause the carcass side to assume a relaxed substantially natural position, and thereafter chilling the carcass to set the structure.

2. The method of treating freshly killed edible animal carcasses which comprises suspending a carcass side from the hind shank and the fore shank with its back side down, securing the hind shank and the fore shank in fixed spread relationship to cause the carcass side to assume a relaxed substantially natural position, and chilling the carcass side to set the structure.

3. The method of treating freshly killed edible animal carcasses which comprises suspending a carcass side, causing the carcass side to assume a relaxed substantially natural position and chilling the carcass to set the structure.

4. The method of treating beef sides which comprises suspending a side of beef with its back side down, causing the side of beef to assume a relaxed substantially natural position, and chilling the side of beef while so suspended to set the structure.

5. The method of treating beef sides which comprises suspending a side of beef from the hind shank and the fore shank with its back side down while the side is warm and before the body heat has left the side, securing the hind shank and the fore shank in fixed spread relationship to cause the side of beef to assume a relaxed, substantially natural position and thereafter chilling the side while so suspended.

6. The method of preparing edible animal carcasses and sides thereof which comprises suspending a carcass by the fore shanks and the hind shanks after eviscerating and while the carcass is still warm, whereby the carcass assumes a relaxed position and while so suspended chilling the carcass.

7. The method of preparing edible animal carcasses and sides thereof which comprises suspending a carcass from the fore shanks and hind shanks after eviscerating and while the carcass is still warm, supporting the carcass at a point intermediate the shanks by an auxiliary suspension, whereby the carcass assumes a relaxed substantially natural position, and then chilling the carcass.

8. The method according to claim 7 in which the auxiliary suspension is in the rib section of the carcass.

FRANK B. BRATEK.
ANDREW S. HARTANOV.